United States Patent
Appireddygari Venkataramana et al.

(10) Patent No.: US 11,409,612 B2
(45) Date of Patent: Aug. 9, 2022

(54) SYSTEM AND METHOD FOR AN APPLICATION CONTAINER BACKUP PRIORITIZATION BASED ON CONTAINER INFORMATION AND RESOURCE AVAILABILITY

(71) Applicant: EMC IP Holding Company LLC, Hopkinton, MA (US)

(72) Inventors: Mahesh Reddy Appireddygari Venkataramana, Bangalore (IN); Shelesh Chopra, Bangalore (IN); Chetan Battal, Bangalore (IN); Swaroop Shankar D H, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 208 days.

(21) Appl. No.: 16/925,615

(22) Filed: Jul. 10, 2020

(65) Prior Publication Data
US 2021/0374015 A1    Dec. 2, 2021

(30) Foreign Application Priority Data
May 27, 2020    (IN) .............................. 202041022160

(51) Int. Cl.
G06F 11/14 (2006.01)
G06F 9/54 (2006.01)
G06F 9/48 (2006.01)

(52) U.S. Cl.
CPC ........ G06F 11/1461 (2013.01); G06F 9/4881 (2013.01); G06F 9/54 (2013.01); G06F 11/1451 (2013.01); G06F 11/1464 (2013.01); G06F 11/1469 (2013.01)

(58) Field of Classification Search
CPC ............. G06F 11/1461; G06F 11/1464; G06F 11/1469; G06F 11/1451; G06F 9/4881; G06F 9/54
USPC .................................................. 711/162, 161
See application file for complete search history.

(56) References Cited

U.S. PATENT DOCUMENTS

2021/0141655 A1*    5/2021    Gamage ................ G06F 9/5027

OTHER PUBLICATIONS

Sochat et al. "Enhancing reproducibility in scientific computing: Metrics and registry for Singularity containers", Year 2017 (Year: 2017).*

* cited by examiner

Primary Examiner — David Yi
Assistant Examiner — Zubair Ahmed
(74) Attorney, Agent, or Firm — Chamberlain, Hrdlicka, White, Williams & Aughtry

(57) ABSTRACT

A method for performing a backup operation includes obtaining, by a backup server, container information associated with a plurality of application containers, generating a container score for each application container in the plurality of application containers based on the container information, identifying a resource availability for a backup agent associated with the plurality of application containers, generating an ordering of the plurality of application containers based on the availability and the container scores, and sending a prioritization list update request to the backup agent based on the ordering.

20 Claims, 6 Drawing Sheets

SYSTEM AND METHOD FOR AN APPLICATION CONTAINER BACKUP PRIORITIZATION BASED ON CONTAINER INFORMATION AND RESOURCE AVAILABILITY

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a backup server, container information associated with a plurality of application containers, generating a container score for each application container in the plurality of application containers based on the container information, identifying a resource availability for a backup agent associated with the plurality of application containers, generating an ordering of the plurality of application containers based on the availability and the container scores, and sending a prioritization list update request to the backup agent based on the ordering.

In general, in one aspect, the invention relates to a system that includes a processor and memory that includes instructions which, when executed by the processor, perform a method. The method includes obtaining, by a backup server, container information associated with a plurality of application containers, generating a container score for each application container in the plurality of application containers based on the container information, identifying a resource availability for a backup agent associated with the plurality of application containers, generating an ordering of the plurality of application containers based on the availability and the container scores, and sending a prioritization list update request to the backup agent based on the ordering.

In general, in one aspect, the invention relates to a non-transitory computer readable medium that includes computer readable program code, which when executed by a computer processor enables the computer processor to perform a method for performing backup operations. The method includes The method includes obtaining, by a backup server, container information associated with a plurality of application containers, generating a container score for each application container in the plurality of application containers based on the container information, identifying a resource availability for a backup agent associated with the plurality of application containers, generating an ordering of the plurality of application containers based on the availability and the container scores, and sending a prioritization list update request to the backup agent based on the ordering.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to systems and methods for performing backup operations on applications and/or application containers. The backup operations may include utilizing a container application programming interface (API) to identify characteristics of an application and/or an application container to determine an initial container score of the application container. The container score for each application container in a set of application containers is compared to generate an ordering of the application containers. A backup agent performing a backup of one or more application containers may utilize the ordering to determine which application containers are to be backed up first. The ordering may be updated dynamically, and the backup agent may monitor the updated ordering during the backup operation.

Figure 1:
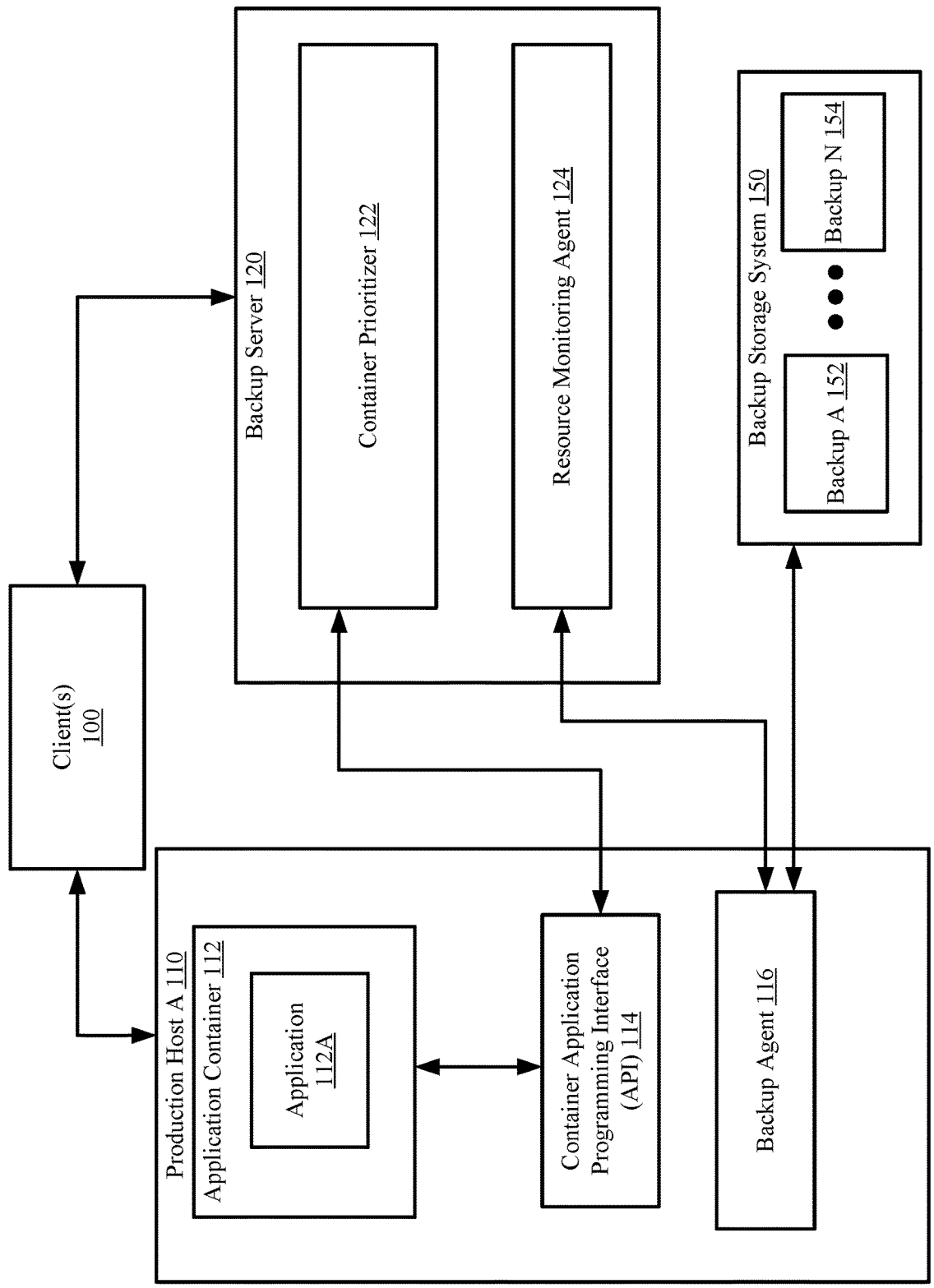
FIG. 1 shows a diagram of a system in accordance with one or more embodiments of the invention.

FIG. 1 shows a diagram of a system in accordance with one or more embodiments of the invention. The system may include one or more clients (100), a production host (110), a backup server (120), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110) stores application containers (e.g., 112). The application containers (e.g., 112) may be logical entities that are executed using computing resources (not shown) of the production host (110). An application container (112) may include an application (e.g., 112A). Each of the applications (e.g., 112A) hosted by the production host (110) may be performing similar or different processes. In one or more embodiments of the invention, the application (112A) provides services to users, e.g., clients (100). For example, the application (112A) may host components. The components may be, for example, instances of databases, email servers, and/or other applications. The application (112A) may host other types of components without departing from the invention. While the production host is illustrated to include one application container (112), the production host may include multiple application containers without departing from the invention. Further, while the application container (112) is illustrated to include an application (112A), the application container (112) may include multiple applications without departing from the invention. The discussion of the application container (112) throughout this application may apply to any application container hosted by the production host (110).

While the system of FIG. 1 and the discussion of the application container (112) throughout this application may specify that the application container (112) hosts one application, those skilled in the art may appreciate that the application container may host any number of applications without departing from the invention.

In one or more embodiments of the invention, the application container (112) is implemented as computer instructions, e.g., computer code, stored on a persistent storage (e.g., on the production host (110)) that when executed by a processor(s) of the production host (110) cause the production host (110) to provide the functionality of the application container (112) described throughout this application.

In one or more embodiments of the invention, the application container utilizes a container application programming interface (API) that is used to obtain information of the application containers (e.g., 112). The information may be provided to the backup server (120) via the container API. In one or more embodiments of the invention, the container API is used by a container prioritizer (122) of the backup server (120) to obtain container information of one or more application containers (e.g., 112).

In one or more embodiments of the invention, container information of an application container may include any information about an application container that may impact the prioritization of the application. For example, the container information may specify virtual cluster information. The virtual cluster information may specify whether the application container is part of an application container cluster (also referred to as a virtual cluster). In one or more embodiments of the invention, an application container cluster is a grouping of application containers in which the applications utilize shared resources (e.g., processing, persistent storage, etc.) of the production host. As a second example, the container information may specify whether the application containers utilize shared storage of a second production host (not shown).

Additional examples of container information include, but are not limited to, virtual cluster information, shared storage information (e.g., whether the application container utilizes a storage that is shared with one or more application containers), storage redundancy information (e.g., whether a replica service that generates replicas of the application data and is distributed to other production hosts is utilized by the application containers), whether a load balancing is performed on networking ports between the production hosts, and the type of application executing on the application container.

In one or more embodiments of the invention, the production host (110) further includes a backup agent (116). The backup agent may include functionality for generating backups of the application container (112). The backups may include copies of data objects. The data objects may be, for example, documents, files, collections of files, and/or other portions of data that may be associated with an application. Further, the backup agent (116) may include functionality for sending the backups to the backup storage system (150).

In one or more embodiments of the invention, the backup agent (116) may generate the backups based on backup policies (124). The backup policies may specify a schedule in which an application container (e.g., 112) is to be backed up. The backup agent (116) may be triggered to execute a backup in response to a backup policy.

In one or more embodiments of the invention, the backup agent prioritizes the backups of one or more application containers using a priority list. The priority list is accessed by the backup agent (116) and updated by the container prioritizer (122). The backup agent performs the backup operations using the priority list via the method illustrated in FIG. 2B. The backup agent may perform backup operations via any other methods without departing from the invention.

In one or more embodiments of the invention, the backup agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116) described throughout this application.

In one or more embodiments of the invention, the backup agent (116) is implemented as computer instructions, e.g., computer code, stored on a persistent storage that when executed by a processor of the production host (110) causes the production host (110) to provide the functionality of the backup agent (116) described throughout this application.

Figure 4:
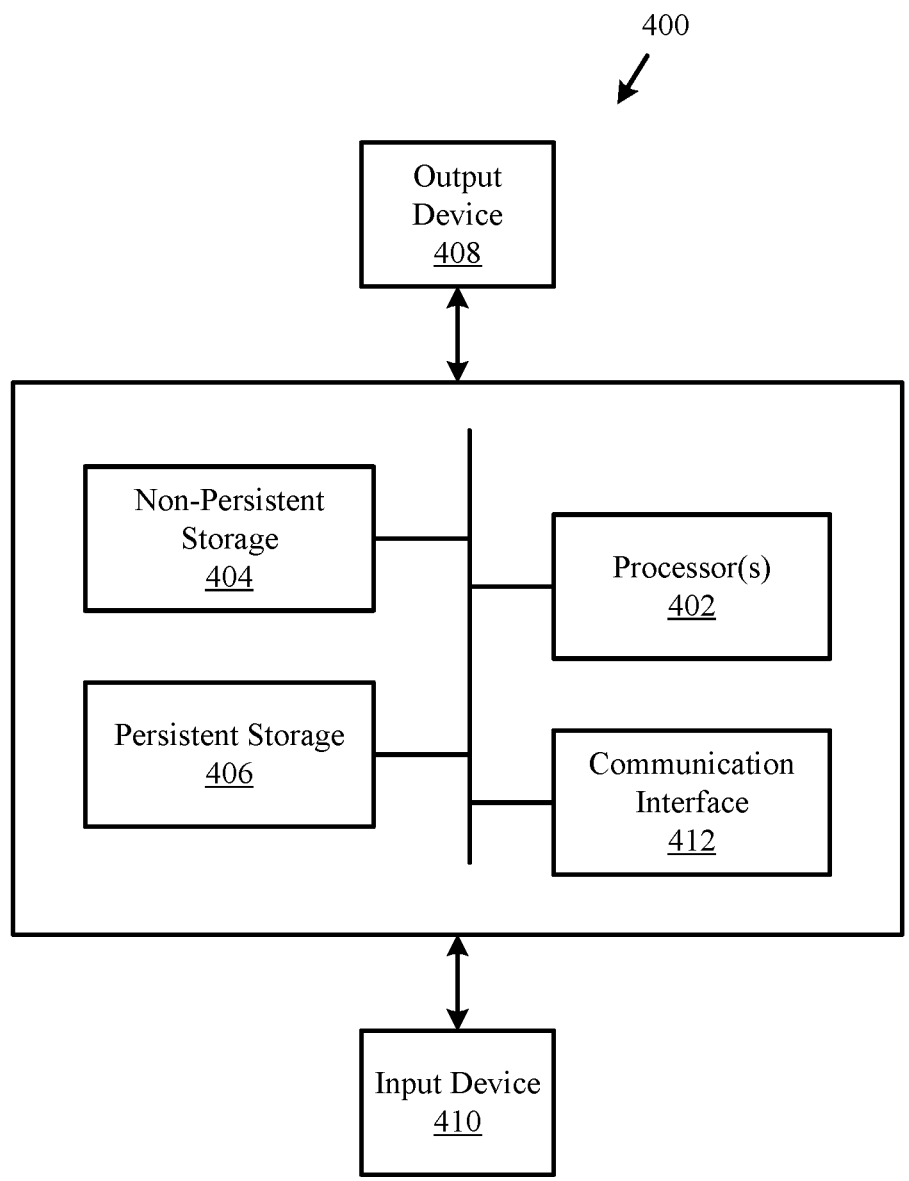
FIG. 4 shows a diagram of a computing device in accordance with one or more embodiments of the invention.

In one or more embodiments of the invention, the production host (110) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110) described throughout this application.

In one or more embodiments of the invention, the production host (110) is implemented as a logical device. The logical device may utilize the computing resources of any number of computing devices and thereby provide the functionality of the production host (110) described throughout this application.

In one or more embodiments of the invention, the backup server (120) manages the operation of generating backups of application containers (e.g., 112). To perform the aforementioned functionality, the backup server (120) may include a container prioritizer (122) and a resource monitoring agent (124). The backup server (120) may include additional, fewer, and/or different components without departing from the invention. Each of the aforementioned components are discussed below.

In one or more embodiments of the invention, the container prioritizer (122) processes container information to prioritize the application containers operating in the production hosts (e.g., 110). In one or more embodiments of the invention, the container prioritizer (122) utilizes API calls to obtain the container information from the application containers. The container information may be processed in accordance with FIG. 2A.

Figure 2A:
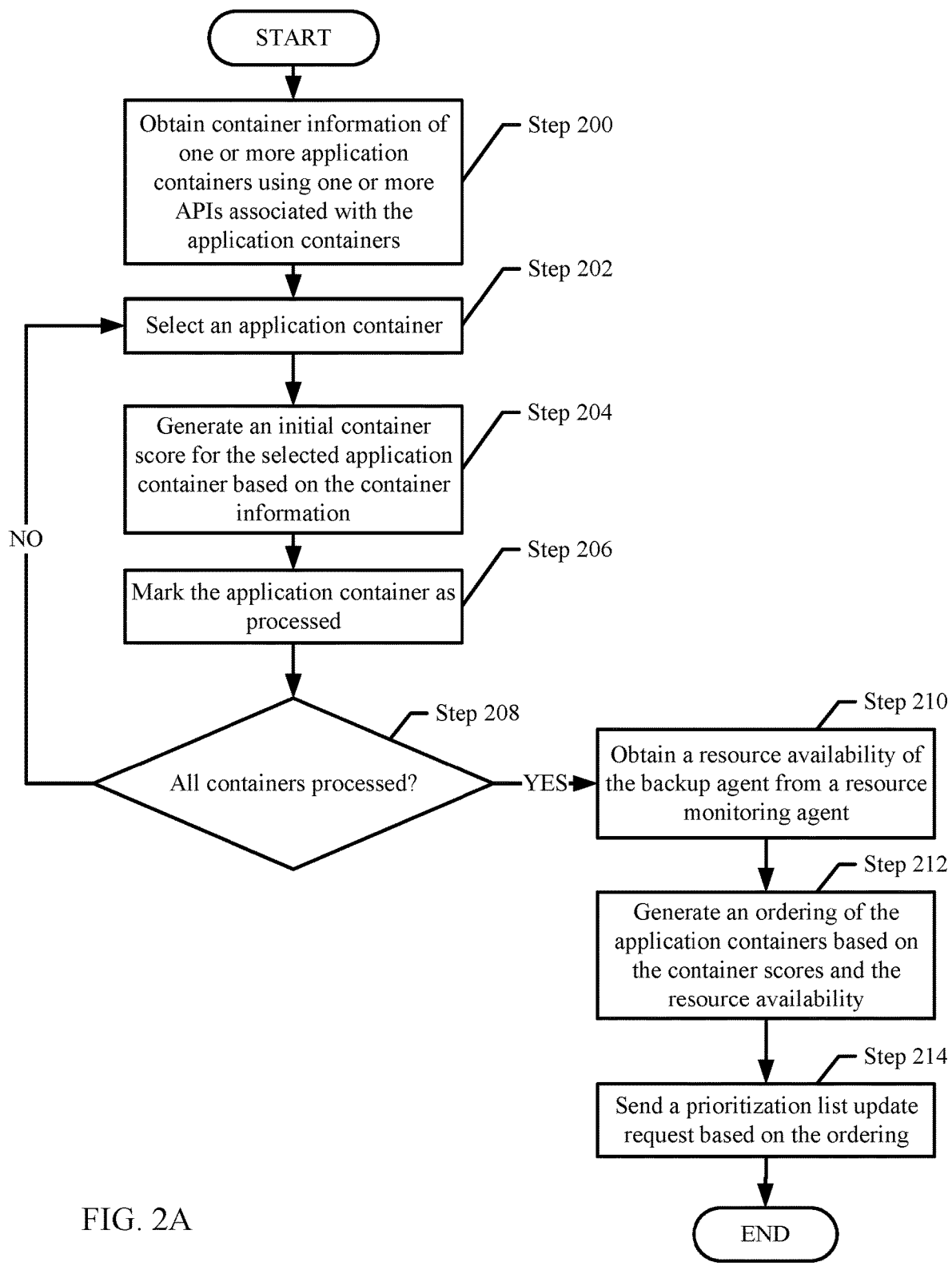
FIG. 2A shows a flowchart for prioritizing backups of application containers in accordance with one or more embodiments of the invention.
Figure 2B:
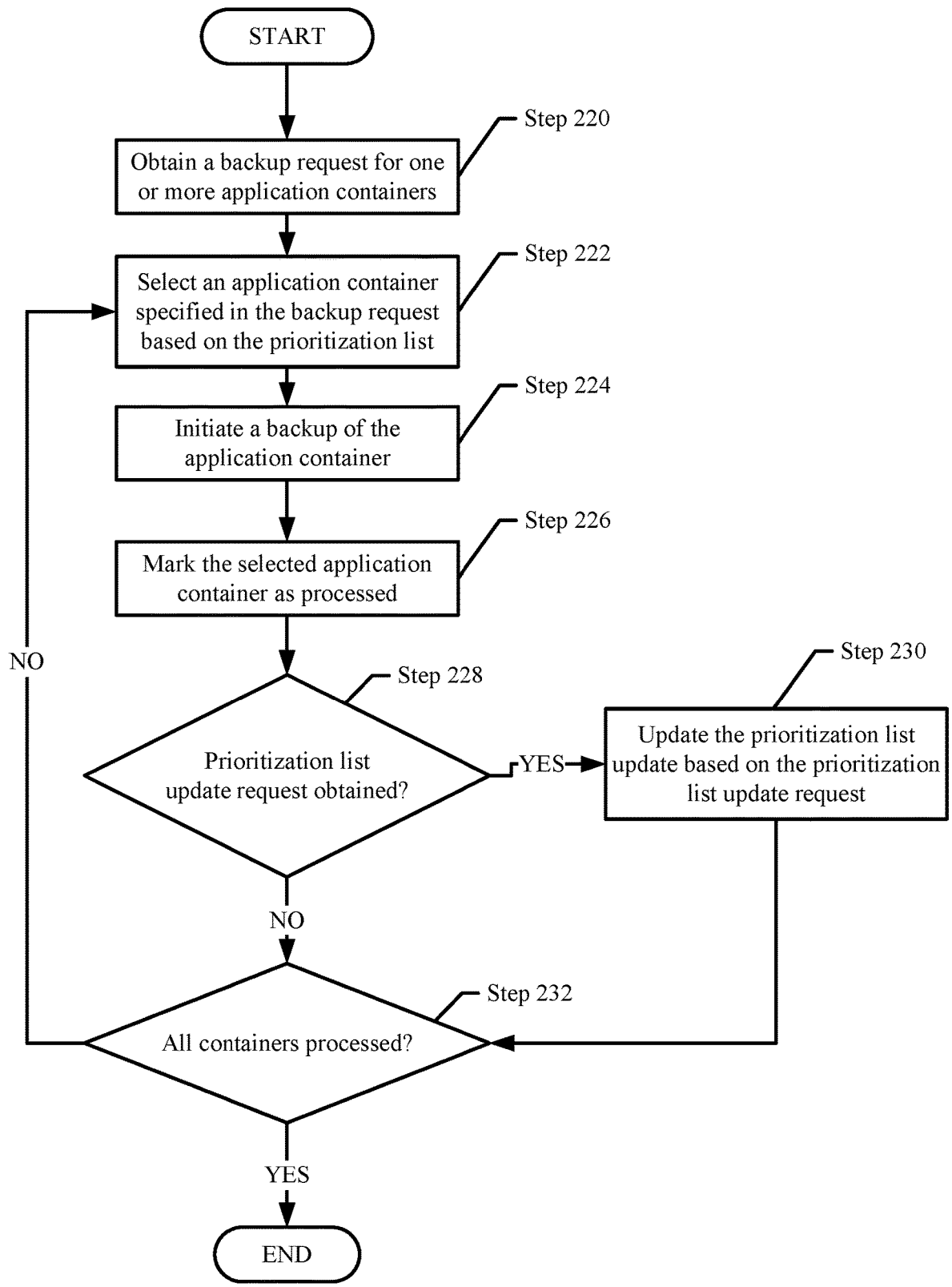
FIG. 2B shows a flowchart for performing a backup operation in accordance with one or more embodiments of the invention.

In one or more embodiments of the invention, the container prioritizer (122) is implemented as computer instructions, e.g., computer code, stored on a persistent storage that when executed by a processor of the backup server (120) causes the backup server (120) to provide the functionality of the container prioritizer (122) described throughout this application and/or all, or a portion thereof, of the method illustrated in FIG. 2B.

In one or more embodiments of the invention, the resource monitoring agent (124) monitors the resources of the backup agent (116) to identify the operability of the backup agent (116) at the time a backup operation is initiated. The resource monitoring agent (124) may monitor the resources by identifying the resources used by the backup agent (116) (e.g., memory, persistent storage, processing, etc.) used during a backup operation and determining whether (or how much of) the resources are available for use by the backup agent (116). Any determinations made by the resource monitoring agent (124) may be specified to the container prioritizer (122).

In one or more embodiments of the invention, the backup server (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup server (120) described throughout this application.

In one or more embodiments of the invention, the backup server (120) is implemented as a logical device. The logical device may utilize the computing resources of any number of computing devices and thereby provide the functionality of the backup server (120) described throughout this application.

In one or more embodiments of the invention, the client(s) (100) utilize services provided by the production host (110), and/or the backup server (120). Specifically, the client(s) (100) may utilize the application containers (112) to obtain, modify, and/or store data. The data may be generated from applications (e.g., 112A) hosted in the application container (112). Further, the client(s) (100) may utilize the backup server (120) to initiate backups of the application containers (e.g., 112). The client(s) (100) may trigger a backup operation performed by the backup server (120) by sending a backup request to the backup agent (116) that specifies backing up the application container (112).

In one or more embodiments of the invention, a client (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) store backups of data objects associated with the application containers. In one or more embodiments of the invention, a backup is a copy of a data object to be stored in a backup storage system (150). The data object may be data associated with an application (e.g., 112A).

In one or more embodiments of the invention, the backup storage system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3A-3C may be performed in parallel with any other steps shown in FIGS. 3A-3C without departing from the scope of the invention.

FIG. 2A shows a flowchart for generating classification tags in accordance with one or more embodiments of the invention. The method shown in FIG. 2A may be performed by, for example, a container prioritizer (122, FIG. 1). Other components of the system illustrated in FIG. 1 may perform the method of FIG. 2A without departing from the invention.

In step 200, container information of one or more application containers is obtained using one or more APIs associated with the application containers. In one or more embodiments of the invention, the container information is obtained by sending one or more API calls to a production host in which the application container is hosted. The API call may specify at least one of the application containers. In one or more embodiments of the invention, each application container may be associated with an API. Alternatively, each production host hosting multiple application containers may be associated with an API.

In step 202, an application container is selected. The selected application container is an unprocessed application container for which container information was obtained in step 200.

In step 204, an initial container score is generated for the selected application container based on the container information. In one or more embodiments of the invention, the initial container score is a numerical value that is associated with a level of priority of the application container. In one or more embodiments of the invention, the initial container score is generated by analyzing the container information to determine how much of a priority the application container is during a backup operation. The analysis may include identifying policies implemented by the container prioritizer that sets predetermined container scores based on specific container information.

In one or more embodiments of the invention, a policy may specify assigning a first score based on the virtual cluster information. The first score may be, for example, five if the application container is part of an application container cluster or 10 if the application container is not part of an application container cluster. The policy may further specify updating the first score to a second score based on the shared storage information. The second score may be a reduced value of the first score if the shared storage information specifies that the application container is associated with a shared storage. In this manner, application containers of application container clusters and application containers utilizing shared storage are not as prioritized as application containers not part of an application container cluster because it may be assumed that their data is further protected in the production host environment.

In step 206, the application container is marked as processed.

In step 208, a determination is made about whether all application containers are processed. If all application containers are processed, the method proceeds to step 210; otherwise, the method proceeds to step 202.

In step 210, a resource availability of the backup agent executing in the production host is obtained from a resource monitoring agent. In one or more embodiments of the invention, the resource monitoring agent obtains the resource availability by monitoring, either synchronously or asynchronously to the container prioritizer, the resources used by the backup agent(s) in the production host environment to update the resource availability of resources for the backup agent to a most recent point in time.

In step 212, an ordering of the application containers is generated based on the container scores and the resource availability. In one or more embodiments of the invention, the application containers are ordered based on the initial container scores. The application containers with higher container scores are ordered higher than the application containers with lower container scores.

In one or more embodiments of the invention, the resource availability is used to lower application containers for application containers with backup agents that have limited availability to resources. In this manner, the application containers that are backed up with backup agents with higher resource availability are prioritized over application containers with backup agents that may be busy, e.g., executing other backup operations.

In step 214, a prioritization list update request is sent to the backup agent(s) based on the ordering. In one or more embodiments of the invention, the prioritization list update request may specify the ordering for the application containers for which the backup may be performed. Further, the prioritization list update request may specify updating an existing prioritization list maintained by the backup agent based on the ordering.

FIG. 2B shows a flowchart for performing a backup operation in accordance with one or more embodiments of the invention. The method shown in FIG. 2B may be performed by, for example, a backup agent (116, FIG. 1). Other components of the system illustrated in FIG. 1 may perform the method of FIG. 2B without departing from the invention.

In step 220, a backup request is obtained for one or more application containers. In one or more embodiments of the invention, the application containers are application containers hosted by the production host in which the backup agent is executing.

In step 222, an application container specified in the backup request is selected based on the prioritization list. In one or more embodiments of the invention, the backup agent analyzes the list of application containers that have not been backed up and identifies the application container that is most prioritized in the prioritization list. The prioritization list may be updated during the backup operation.

In step 224, a backup of the application container is initiated. In one or more embodiments of the invention, the backup is initiated by generating a second application container, storing a copy of the application data, configuration files, system libraries, databases, and/or any other data that is associated with the application. The copy of the data associated with the application may be stored in the second application container as the backup. The backup may be transferred to the backup storage system.

In step 226, the selected application is marked as processed.

In step 228, a determination is made about whether a prioritization list update request is obtained. If the prioritization list update request is obtained, the method proceeds to step 230; otherwise, the method proceeds to step 232.

In step 230, the prioritization list is updated based on the prioritization list update request. In one or more embodiments of the invention, the prioritization list is updated to be synchronized with the ordering generated in FIG. 2A. In other words, the application containers specified in the ordering of the prioritization list update request are reordered in the prioritization list such that the ordering is consistent with the ordering specified in the prioritization list update request.

In step 232, a determination is made about whether all application containers specified in the backup request are processed. If all application containers are processed, the method ends following step 232; otherwise, the method proceeds to step 222.

Example

Figure 3A:
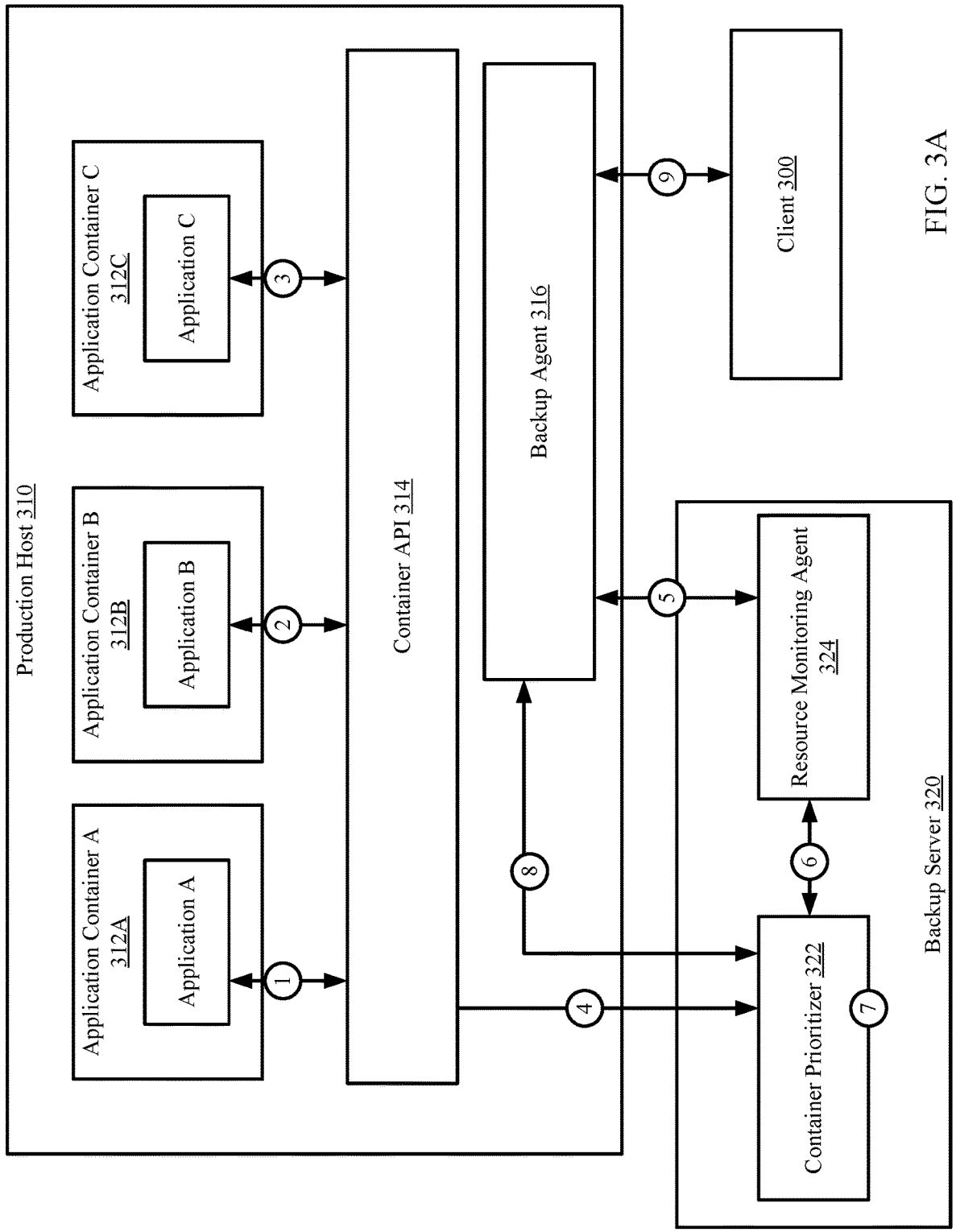
FIGS. 3A-3B show an example in accordance with one or more embodiments of the invention.
Figure 3B:
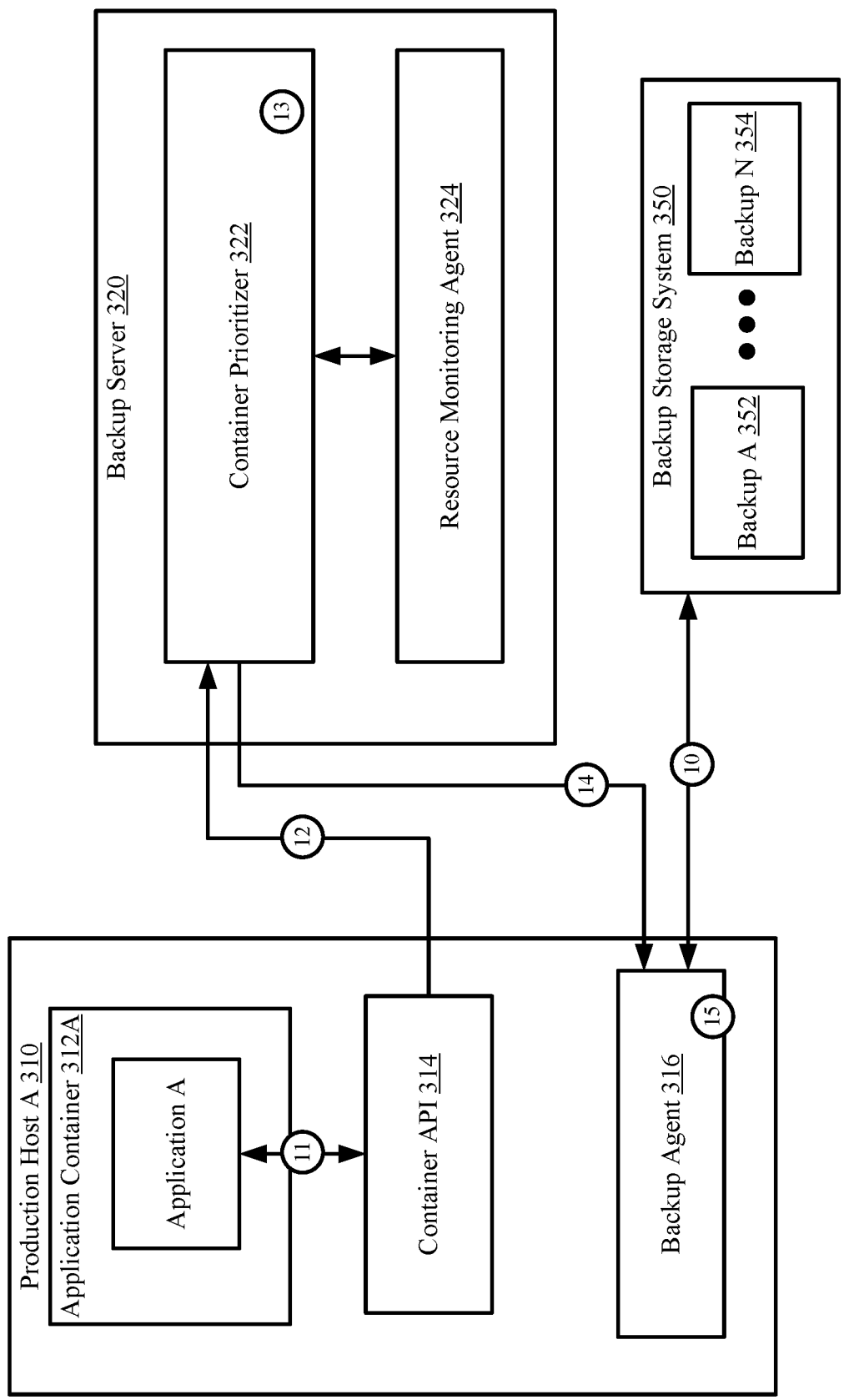

The following section describes an example. The example, illustrated in FIGS. 3A-3B, is not intended to limit the invention. Turning to the example, consider a scenario in which a system is monitoring events occurring in application containers hosted by a production host.

FIG. 3A shows an example system. The example system includes a production host (310) that includes three application containers (312A, 312B, 312C), a container API (314) that obtains container information for the three containers (312A, 312B, 312C) and provides the container information to the backup server (320).

At a first point in time, the container API (314) obtains the container information from application containers A, B, and C [1, 2, 3]. The container information specifies that application containers A and B (312A, 312B) are associated with the same application container grouping. Further, the container information specifies that application container C (312C) is not associated with an application grouping and is associated with a shared storage. In other words, the application data in application C is stored in shared storage with other application containers (not shown). The obtained container information is provided to a container prioritizer (322) [4].

At a later point in time, the resource monitoring agent (324) monitors the usage of computing resources (not shown) in the production host (310) by the backup agent (316) to obtain resource availability [5]. The resource availability is provided to the container prioritizer (322) in response to a request sent by the container prioritizer (322) [6]. The container prioritizer (322) uses the container information and the resource availability of the backup agent (316) to perform the method of FIG. 2A. The result of the method performed is an ordering. The ordering is provide to the backup agent (316) [8]. The backup agent updates a prioritization list (not shown) that specifies the ordering. The ordering specifies prioritizing application container C (312C) over application containers A and B (312A, 312C).

At a later point in time, a client (300) sends a backup request for the application containers (312A, 312B, 312C) to the backup agent (316).

FIG. 3B shows the example system at a later point in time. In response to the backup request, the backup agent performs the method of FIG. 2B and initiates a backup of the application containers based on the prioritization list. The first backup performed is on application container C. The backup is generated and transferred to the backup storage system (350) [10].

During the backup of application container C, additional container information for application A is obtained by the container API (314) [11]. The additional container application specifies that application A is no longer part of an application grouping. The additional container application is provided to a container prioritizer (322) [12]. The container prioritizer (322) performs the method of FIG. 2A using the additional container information to generate a new ordering [13]. The new ordering prioritizes application container A over application containers B and C. The new ordering is sent to the backup agent (316) [14] as a prioritization list update request.

The backup agent (316) obtaining the prioritization list update request, prioritizes the backup of application container A over application container B [15]. In this manner, the prioritization of the application containers being backed up during a backup operation is maintained up-to-date.

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the backup agent. Further, such instructions may correspond to computer readable instructions that are stored on one or more non-transitory computer readable mediums.

One or more embodiments of the invention may improve the operation of one or more computing devices. More specifically, embodiments of the invention improve the reliability of backups of one or more application containers. During a backup operation, the resource availability of the backup agent executing the backup operation may not be absolutely reliable. As such, a backup operation may be interrupted and/or unexpectedly fail at any moment. Embodiments of the invention enable more vulnerable application containers to be prioritized even while the prioritization may be dynamic. Because of the potentially dynamic nature of the vulnerability of application containers and the possibly large number of application containers backed up during a backup operation, it is important for the backup agent to have functionality to reprioritize backups of application containers.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing application containers, the method comprising:
    obtaining, by a backup server, container information associated with a plurality of application containers;
    generating a container score for each application container in the plurality of application containers based on the container information;
    identifying a resource availability for a backup agent associated with the plurality of application containers;
    generating an ordering of the plurality of application containers based on the availability and the container scores; and
    sending a prioritization list update request to the backup agent based on the ordering.

2. The method of claim 1, wherein the priority listing update results in a change in a backup operation performed by the backup agent.

3. The method of claim 1, wherein identifying the resource availability for the backup agent comprises:
    monitoring resources utilized by the backup agent to obtain the resource availability.

4. The method of claim 1, wherein the container information comprises at least one of:
    virtual cluster information, shared storage information, and storage redundancy information.

5. The method of claim 4, wherein generating a container score for each application container comprises:
    selecting a first application container;
    generating a first score based on virtual cluster information of the first application container;
    generating a second score based on the first score and shared storage information of the first application container; and
    generating the container score based on the second score and storage redundancy information associated with the first application container.

6. The method of claim 1, wherein the container information is obtained using a container application programming interface (API).

7. The method of claim 1, wherein the prioritization list update request specifies updating a prioritization list stored by the backup agent based on the ordering.

8. A system, comprising:
    a processor; and
    memory comprising instructions which, when executed by the processor, perform a method, the method comprising:
        obtaining container information associated with a plurality of application containers;
        generating a container score for each application container in the plurality of application containers based on the container information;
        identifying an availability status for a backup agent associated with the plurality of application containers; and
        generating an ordering of the plurality of application containers based on the availability and the container scores; and
        sending a prioritization list update request to the backup agent based on the ordering.

9. The system of claim 8 wherein the priority listing update results in a change in a backup operation performed by the backup agent.

10. The system of claim 8, wherein identifying the resource availability for the backup agent comprises:
    monitoring resources utilized by the backup agent to obtain the resource availability.

11. The system of claim 8, wherein the container information comprises at least one of:
    virtual cluster information, shared storage information, and storage redundancy information.

12. The system of claim 11, wherein generating a container score for each application container comprises:
    selecting a first application container;
    generating an initial score based on virtual cluster information of the first application container;
    generating an updated initial score based on the initial score and shared storage information of the first application container; and
    generating a container score based on the updated initial score and storage redundancy information associated with the first application container.

13. The system of claim 8, wherein the container information is obtained using a container application programming interface (API).

14. The system of claim 13, wherein the prioritization list update request specifies updating a prioritization list stored by the backup agent based on the ordering.

15. A non-transitory computer readable medium comprising computer readable program code, which when executed by a computer processor enables the computer processor to perform a method, the method comprising:
    obtaining, by a backup server, container information associated with a plurality of application containers;
    generating a container score for each application container in the plurality of application containers based on the container information;
    identifying a resource availability for a backup agent associated with the plurality of application containers; and
    generating an ordering of the plurality of application containers based on the availability and the container scores; and
    sending a prioritization list update request to the backup agent based on the ordering.

16. The non-transitory computer readable medium of claim 15, wherein the priority listing update results in a change in a backup operation performed by the backup agent.

17. The non-transitory computer readable medium of claim 15, wherein identifying the resource availability for the backup agent comprises:
    monitoring resources utilized by the backup agent to obtain the resource availability.

18. The non-transitory computer readable medium of claim 15, wherein the container information comprises at least one of: virtual cluster information, shared storage information, and storage redundancy information.

19. The non-transitory computer readable medium of claim 18, wherein generating a container score for each application container comprises:
    selecting a first application container;
    generating an initial score based on virtual cluster information of the first application container;
    generating an updated initial score based on the initial score and shared storage information of the first application container; and generating a container score based on the updated initial score and storage redundancy information associated with the first application container.

20. The non-transitory computer readable medium of claim 15, wherein the container information is obtained using a container application programming interface (API).

* * * * *